(12) United States Patent
Strassman et al.

(10) Patent No.: US 7,798,760 B2
(45) Date of Patent: Sep. 21, 2010

(54) HITCH-MOUNTED CARGO LIFT FOR PERSONAL MOBILITY DEVICE

(76) Inventors: David R. Strassman, 742 S. Gammon Rd., Madison, WI (US) 53719; Jeré Fabick, W354N5191 River Rd., Oconomowoc, WI (US) 53066

( * ) Notice: Subject to any disclaimer, the term of this patent is extended or adjusted under 35 U.S.C. 154(b) by 278 days.

(21) Appl. No.: 11/825,996

(22) Filed: Jul. 10, 2007

(65) Prior Publication Data
US 2008/0025828 A1  Jan. 31, 2008

Related U.S. Application Data

(60) Provisional application No. 60/819,774, filed on Jul. 10, 2006.

(51) Int. Cl.
*B60P 9/00* (2006.01)
(52) U.S. Cl. .................. 414/462; 414/563
(58) Field of Classification Search .......... 224/526; 410/3; 414/462, 563
See application file for complete search history.

(56) References Cited

U.S. PATENT DOCUMENTS

| | | | |
|---|---|---|---|
| 4,353,436 A | 10/1982 | Rice et al. | |
| 4,741,660 A * | 5/1988 | Kent | 414/462 |
| 4,778,333 A * | 10/1988 | Youmans et al. | 414/563 |
| 5,011,361 A | 4/1991 | Peterson | |
| 5,137,411 A | 8/1992 | Eul et al. | |
| 5,180,275 A | 1/1993 | Czech et al. | |
| 5,431,522 A | 7/1995 | Ross | |
| 5,489,110 A | 2/1996 | Van Dusen | |
| 5,567,107 A | 10/1996 | Bruno et al. | |
| 5,713,716 A * | 2/1998 | Kubo | 414/618 |
| 5,816,763 A | 10/1998 | Hamann et al. | |
| 5,984,613 A * | 11/1999 | Motilewa | 414/462 |
| 5,984,616 A * | 11/1999 | Youmans et al. | 414/563 |
| 6,238,171 B1 * | 5/2001 | Carter | 414/563 |
| 6,386,817 B1 | 5/2002 | Cash | |
| 6,655,895 B1 | 12/2003 | Dahl | |
| 6,699,616 B2 * | 3/2004 | Wu | 429/98 |
| 6,824,156 B2 | 11/2004 | Smith | |
| 6,887,027 B2 | 5/2005 | O'Leary et al. | |
| 6,902,181 B1 | 6/2005 | Dye | |
| 6,974,146 B2 | 12/2005 | Abair | |
| 6,983,953 B1 | 1/2006 | Damron | |
| 7,044,493 B1 | 5/2006 | Wilson | |
| 2003/0152449 A1 * | 8/2003 | Marich et al. | 414/462 |
| 2003/0156930 A1 * | 8/2003 | Ahedo, Jr. | 414/462 |
| 2003/0165376 A1 * | 9/2003 | Bruno et al. | 414/462 |
| 2003/0230607 A1 * | 12/2003 | Tweet et al. | 224/401 |
| 2004/0164114 A1 * | 8/2004 | Fraer et al. | 224/518 |
| 2005/0220598 A1 * | 10/2005 | Shubert | 414/563 |
| 2006/0072999 A1 * | 4/2006 | Manley, Sr. | 414/563 |
| 2006/0093462 A1 * | 5/2006 | Pradenas | 414/462 |

* cited by examiner

*Primary Examiner*—Gregory W Adams
(74) *Attorney, Agent, or Firm*—Joseph T. Leone, Esq.; DeWitt Ross & Stevens S.C.

(57) ABSTRACT

A vehicle-mounted cargo lift including a frame and carry arms suitable for carrying a scooter, a personal transportation device, or other cargo. The frame includes a power inverter/converter, which provides power to a motorized worm drive, which raises and lowers the carry arms. Wheel chocks on the carry arms hold in place the scooter wheels. The cargo lift attaches to the back of a vehicle via a trailer hitch.

18 Claims, 7 Drawing Sheets

HITCH-MOUNTED CARGO LIFT FOR PERSONAL MOBILITY DEVICE

CROSS-REFERENCE TO RELATED APPLICATIONS

Priority is hereby claimed to provisional application Ser. No. 60/819,774, filed Jul. 10, 2006, which is incorporated herein by reference.

FIELD OF INVENTION

This invention relates generally to an apparatus for transporting personal mobility devices and, more specifically to an apparatus for transporting two-wheeled mobility devices on the back of a vehicle.

DESCRIPTION OF THE PRIOR ART

The need to transport large or odd sized cargo has presented a conundrum for the average owner of a vehicle. A cargo item that is too large to fit inside the cabin of the car or in the trunk generally must be carried on the outside of the vehicle. The prior art is filled with examples of flat bed trailers, roof racks, luggage racks and plenty of commercial rentals available for single or sporadic usage. However, for those that must carry a single large item on a daily basis, an efficient and convenient transportation device is essential.

Users of a personal mobility device such as a scooter or wheelchair have several options for vehicle-based transportation. Generally, these prior art apparatuses provide a platform, or flat structure, on which the conventionally four wheeled device is loaded. Because of the weight of power scooters, a suitable transportation device is often bulky and generally must include a ramp or other cumbersome loading device.

As technology has developed, so has the selection of personal mobility devices. The gyroscopically-operated Segway®-brand human transporter has become a very popular option. Segway®-brand human transporter is a registered trademark of Segway, Inc., a Delaware corporation whose corporate office is in Bedford, N.H. Segway®-brand human transporters have two wheels and are not suitable for transportation using a conventional prior art transport apparatus. Therefore, a need exists for an apparatus to efficiently load and transport a two-wheeled scooter device in a convenient and secure manner.

SUMMARY

The present invention is a cargo lift comprising a frame, at least one carry arm, at least one wheel chock, a lift mechanism, at least one locking arm, a mounting arm, a height-adjusting mechanism, and a power inverter/converter. The carry arm is attached to the frame and is rotatably movable from a first position substantially parallel to the frame to a second position substantially perpendicular to the frame. When the carry arm is in the second position, the wheel chock is located on the carry arm at a position distal from the frame. The lift mechanism is operationally linked to the frame and dimensioned and configured to translate the carry arm from a first loading position to a second towing position. The lift mechanism comprises a worm drive disposed substantially parallel to the frame and wherein a first end of the worm drive is operationally linked to the carry arm. The worm drive is also dimensioned and configured so that when the worm drive is rotated, the carry arm is translated from the first loading position to the second towing position. The locking arm comprises a proximal end and a distal end, and is connected to the frame at its proximal end. The distal end extends perpendicularly outward from the frame and extends over the carry arm. The locking arm further comprises a bumper on the distal end. The mounting arm is attached to the frame and dimensioned and configured to matingly engage a towing vehicle. The height-adjusting mechanism is fixed to the mounting arm and the frame, and is dimensioned and configured to raise or lower the frame in relation to the towing vehicle. The power inverter/converter is attached to the frame and is dimensioned and configured to provide power to the cargo carried on the lift. The power inverter/converter further comprises a power cord.

The present invention is further directed to a cargo lift comprising a frame, at least carry arm, at least one wheel chock, a lift mechanism, at least one locking arm, a mounting arm, a height-adjusting mechanism, and a power supply conduit. The power supply conduit is attached to the frame and is dimensioned and configured to provide power to the cargo carried on the lift. The power supply conduit further comprises a power cord. The lift mechanism comprises a worm drive disposed substantially parallel to the frame. A first end of the worm drive is operationally linked to the carry arm and when the worm drive is rotated, the carry arm is translated from the first loading position to the second towing position. The worm drive can be operated either manually or via an electric motor. The electric motor is operationally connected to the power supply conduit.

The present invention is a cargo lift, which allows a user to easily secure and transport a two-wheeled scooter on the back of their vehicle. The lift connects with a conventional trailer hitch mounting socket. The lift also includes a height adjusting mechanism positioned between the mounting arm and the frame, which allows the entire lift to raise and lower relative to the ground. This is distinctly advantageous because it allows the lift to be used on vehicles with a high ground clearance or a low ground clearance.

After the lift has been properly attached to the back of the vehicle, the two carry arms are released from the stowed position and folded into the locked towing position, parallel to the ground. The carry arms are connected to the lower end of the frame. In order to easily load the two-wheeled scooter onto the lift, the carry arms must be lowered to rest on the ground. This is achieved by a worm gear located within the frame, and is operated by an electric motor, or a manual hand crank. The electric motor is powered by a power inverter/converter attached to the frame. The user simply turns on the motor, which rotates the worm gear, which in turn lowers the end of the frame and puts the carry arms onto the ground.

With the carry arms stably placed on the ground, the user must only roll the two-wheeled scooter onto the carry arms. The scooter wheels securely rest between sets of chocks attached to the carry arms. The chocks prevent the wheels from rolling forward or backwards while in motion.

The scooter is secured to the frame of the lift by two locking arms. The locking arms are rotatably connected to the frame and attached to the scooter. The locking arms are secured in place by lynch pins, thus securely hold the scooter on the lift. After the scooter is securely fastened to the lift, the carry arms are raised to a suitable height above the ground. This is accomplished again by the worm drive. The scooter is now secured to the back of a user's vehicle and can be transported safely and securely.

Another advantage of the present invention is the ability to charge the cargo while it is being towed. The power inverter/converter has a power cord into which the cargo can connect.

The present invention attaches to the vehicle's electrical system through a standard round seven-prong (RV style) trailer electric plug. This feature allows the present invention to be easily adaptable to include lights or other electrical systems.

The objects and advantages of the invention will appear more fully from the following detailed description of the preferred embodiment of the invention made in conjunction with the accompanying drawings.

DETAILED DESCRIPTION

Figure 1:
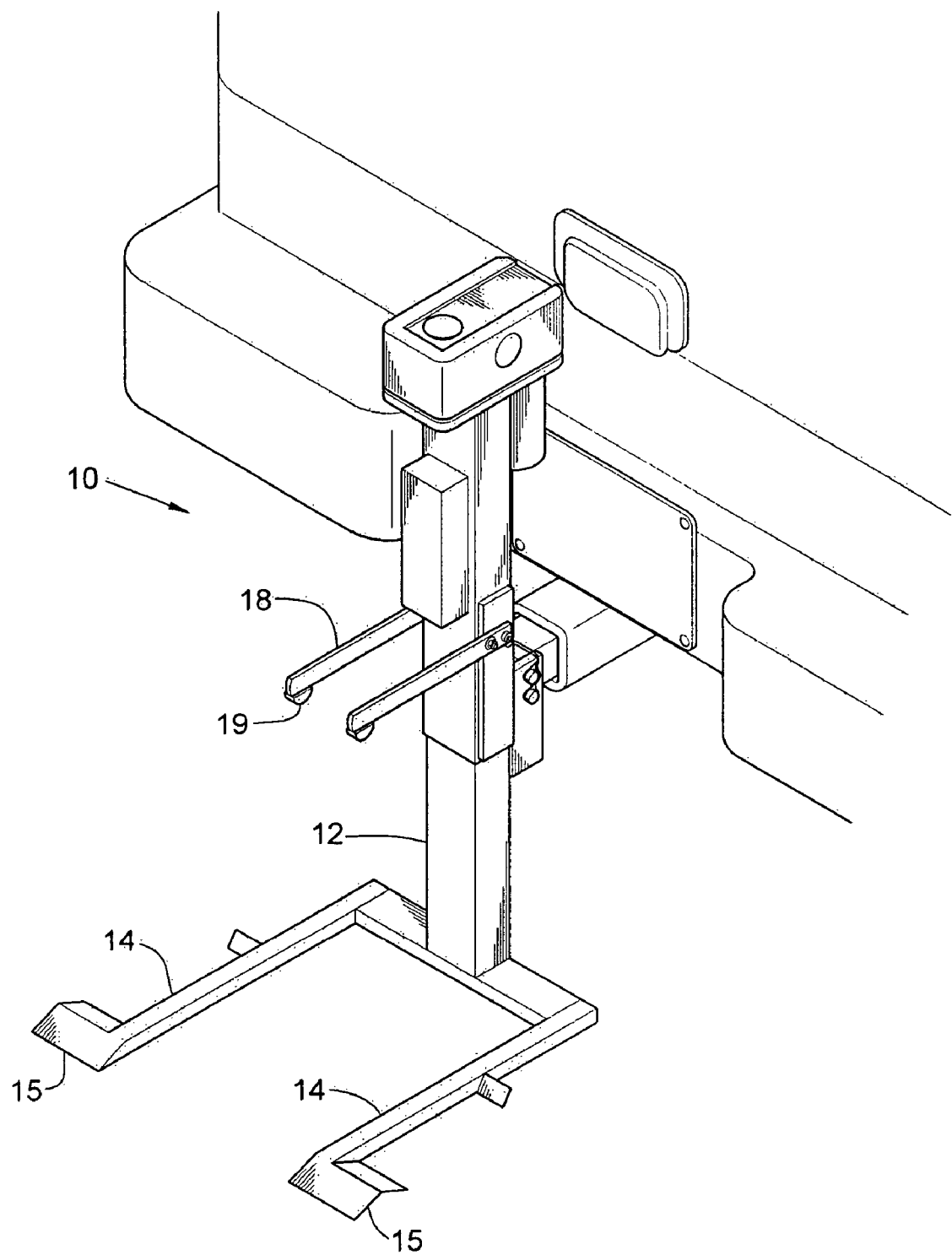
FIG. 1 is a perspective of the cargo lift with the carry arms in the fully lowered position.

Reference will now be made to the attached drawings, where the same reference numerals are used throughout the various views.

Referring to FIGS. 1-7, where the same reference numerals are used throughout the drawings, the invention is a cargo lift 10. As shown in the figures, the lift 10 is dimensioned and configured to lift, and to lock into place, a Segway®-brand human transporter (hereinafter generically referred to as a scooter, 100) for transport by a conventional trailer hitch receiver attached to a motor vehicle. ("Segway" is a registered trademark of Segway, Inc., a Delaware corporation whose corporate office is in Bedford, N.H.) For purposes of brevity only, the following description is limited to a lift 10 dimensioned and configured to carry such a scooter 100. However, the invention explicitly encompasses lift designs having the same claimed elements that are specifically dimensioned to carry other types of cargo.

The cargo lift 10 includes a vertically-oriented, telescoping frame 12, with spaced carry arms 14 attached to the frame. The carry arms 14 are preferably oriented so that they extend parallel to the direction of travel of the towing vehicle. The carry arms 14 are pivotally attached, at their proximal ends, to the frame; the distal ends of the carry arms 14 rotate around the axis created by the proximal ends. In the preferred embodiment, the distal ends of the carry arms 14 have a freedom of movement of about 90 degrees: from substantially perpendicular to the frame 12 (substantially parallel to the ground) to substantially parallel to the frame 12 (substantially perpendicular to the frame.) Wheel chocks 15 are provided on the carry arms 14 to cradle the wheels of the scooter 100 (see FIG. 6). In the preferred embodiment, the wheel chocks 15 are present in two places, extending laterally, on each of the two carry arms 14, as shown in FIG. 1. However, the wheel chocks 15 can also extend medially between the carry arms 14 so that the wheels of the scooter 100 rest between the carry arms 14. In another embodiment, the cargo lift 10 can have a single carry arm 14 with wheel chocks 15 that extend from the carry arm 14 sufficiently enough to support the wheels of the scooter 100.

Figure 3:
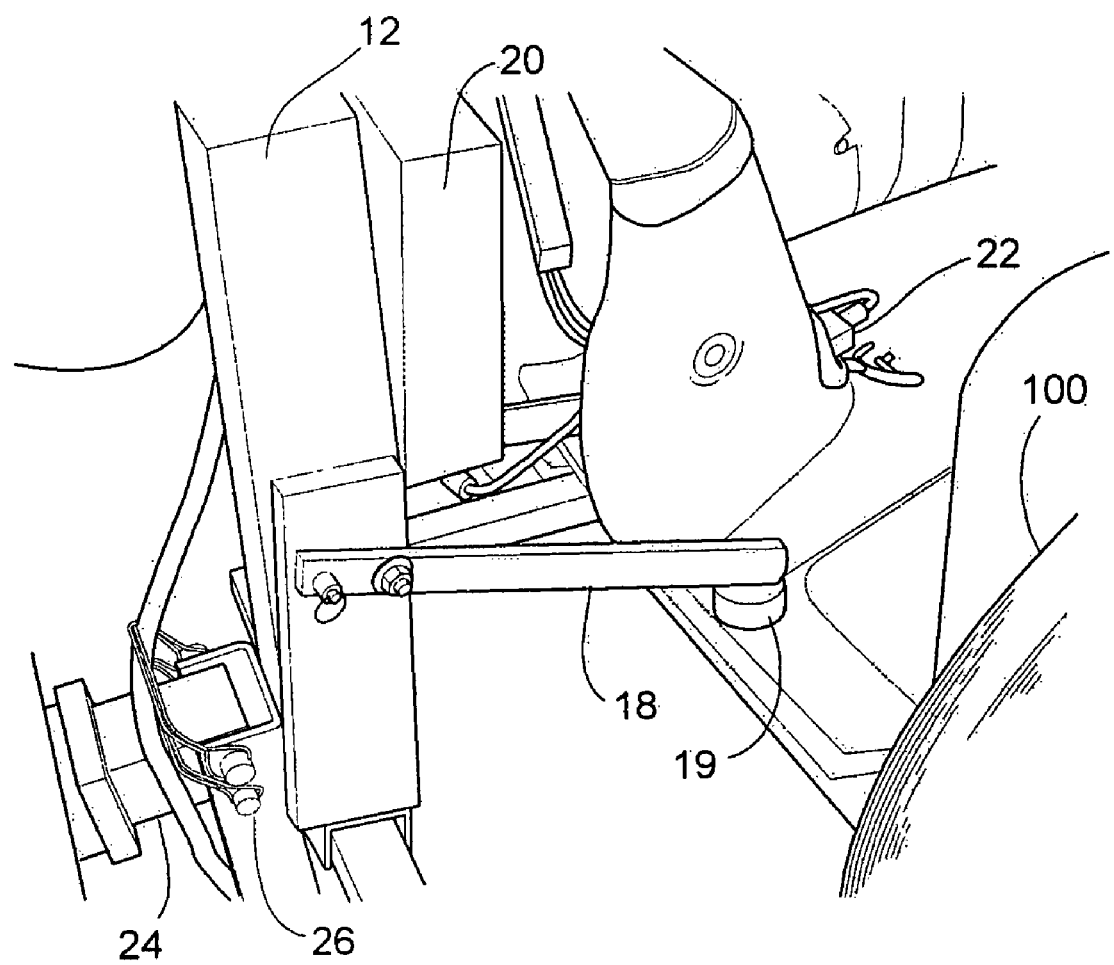
FIG. 3 is a side elevation of the frame, the height-adjusting mechanism and the locking arms.

In the preferred embodiment, the cargo lift 10 also includes at least one locking arm 18 connected at its proximal end to the frame 12. The locking arm 18 includes a bumper 19, attached to its distal end, which functions to engage the cargo firmly, but resiliently, so as not to damage the surface of the cargo. See especially FIG. 3, which depicts a scooter 100, resting upon the lift 10, with the lift in the raised position. As shown in FIG. 3, with the lift 10 in the raised position, the locking are 18 firmly engaging the deck of the scooter 100, thereby securely locking the scooter onto the lift 12. This prevents the scooter 100 from falling off of the lift 12 during transport, and also prevents theft of scooter 100 when the transporting vehicle is parked or otherwise left unattended.

Figure 2:
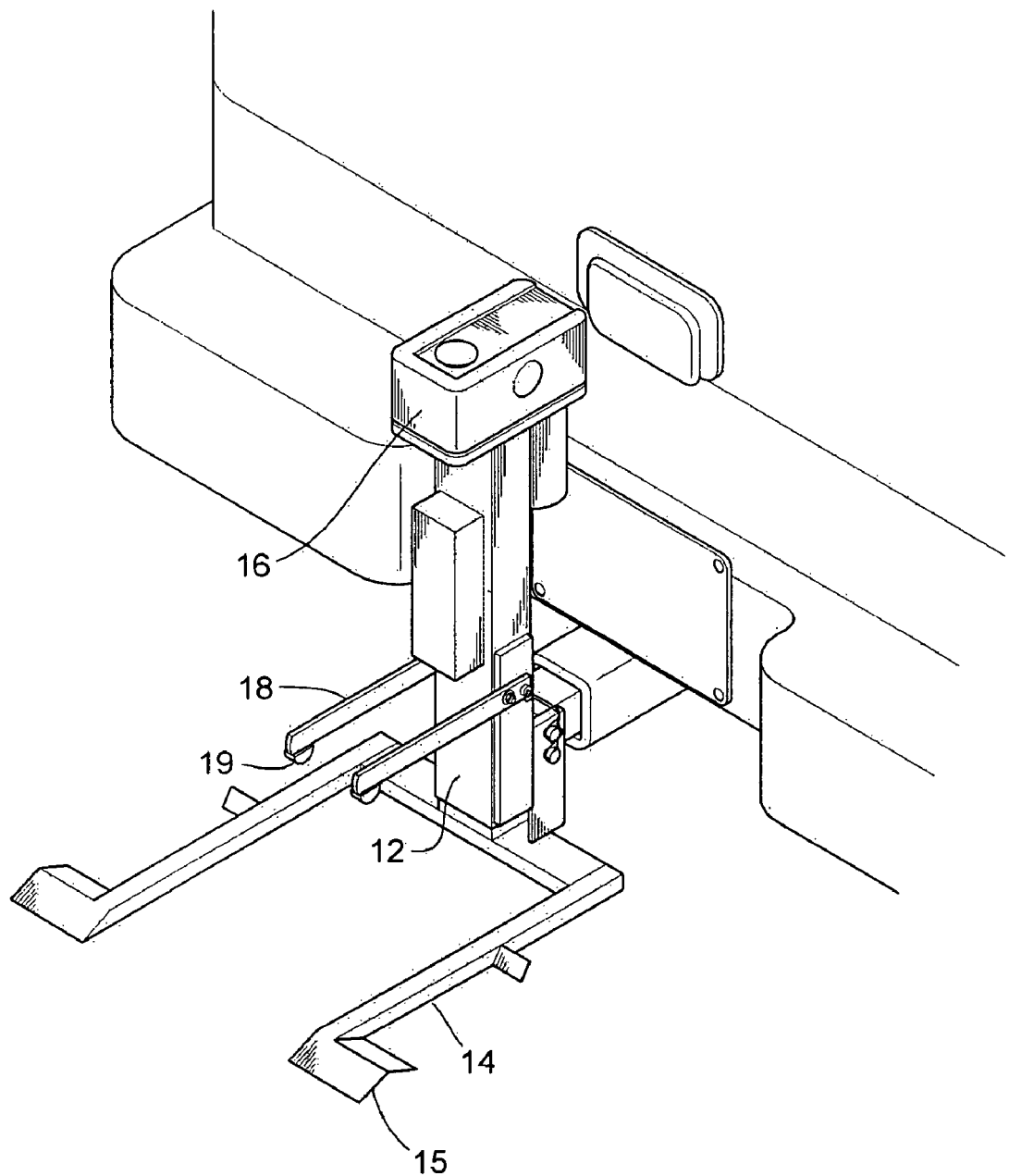
FIG. 2 is a side elevation of the cargo lift with the carry arms in the fully raised position.
Figure 6:
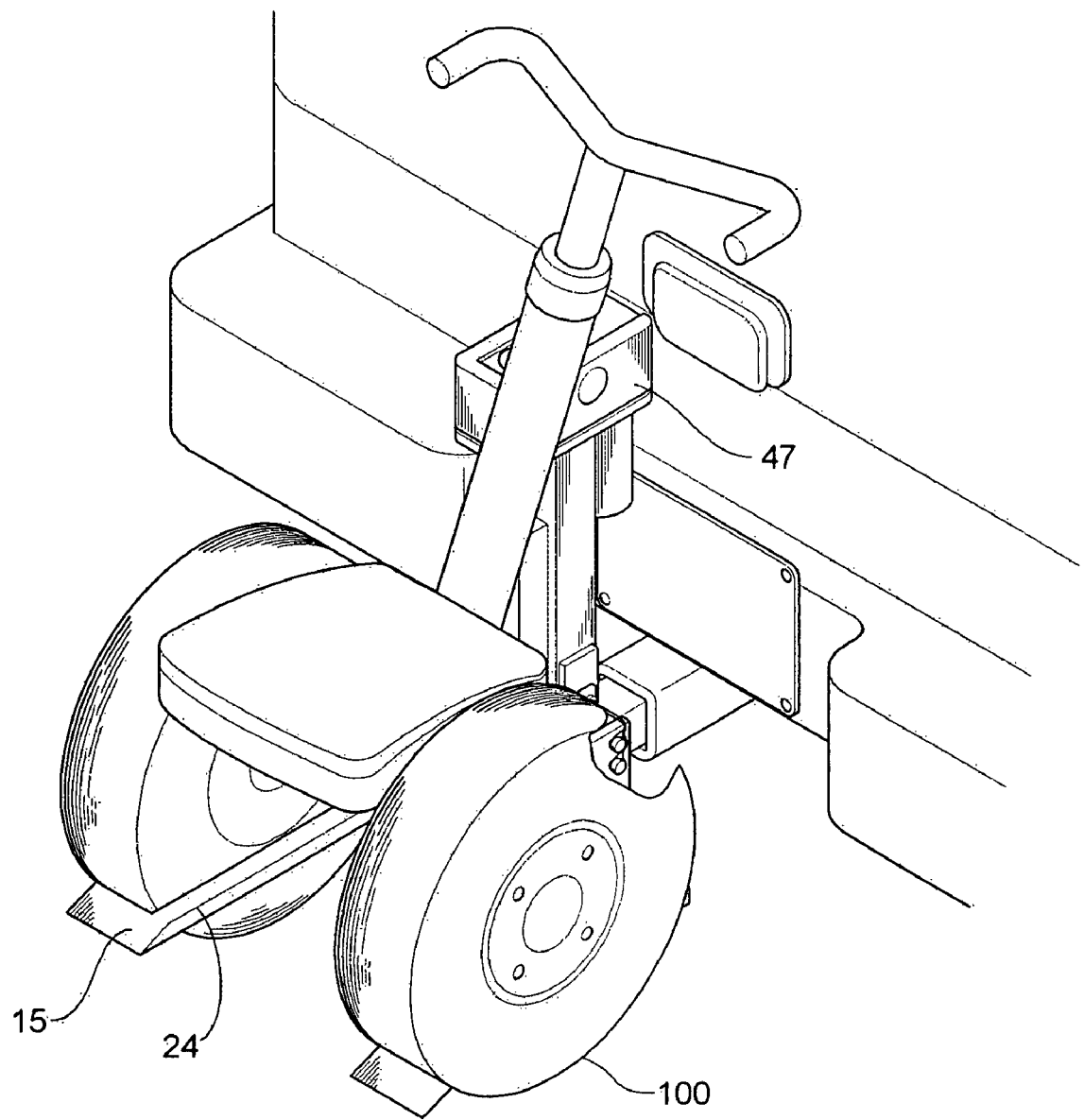
FIG. 6 is a side plan view of the cargo lift with a personal transporter secured on the carry arms and raised to the towing position.
Figure 7:
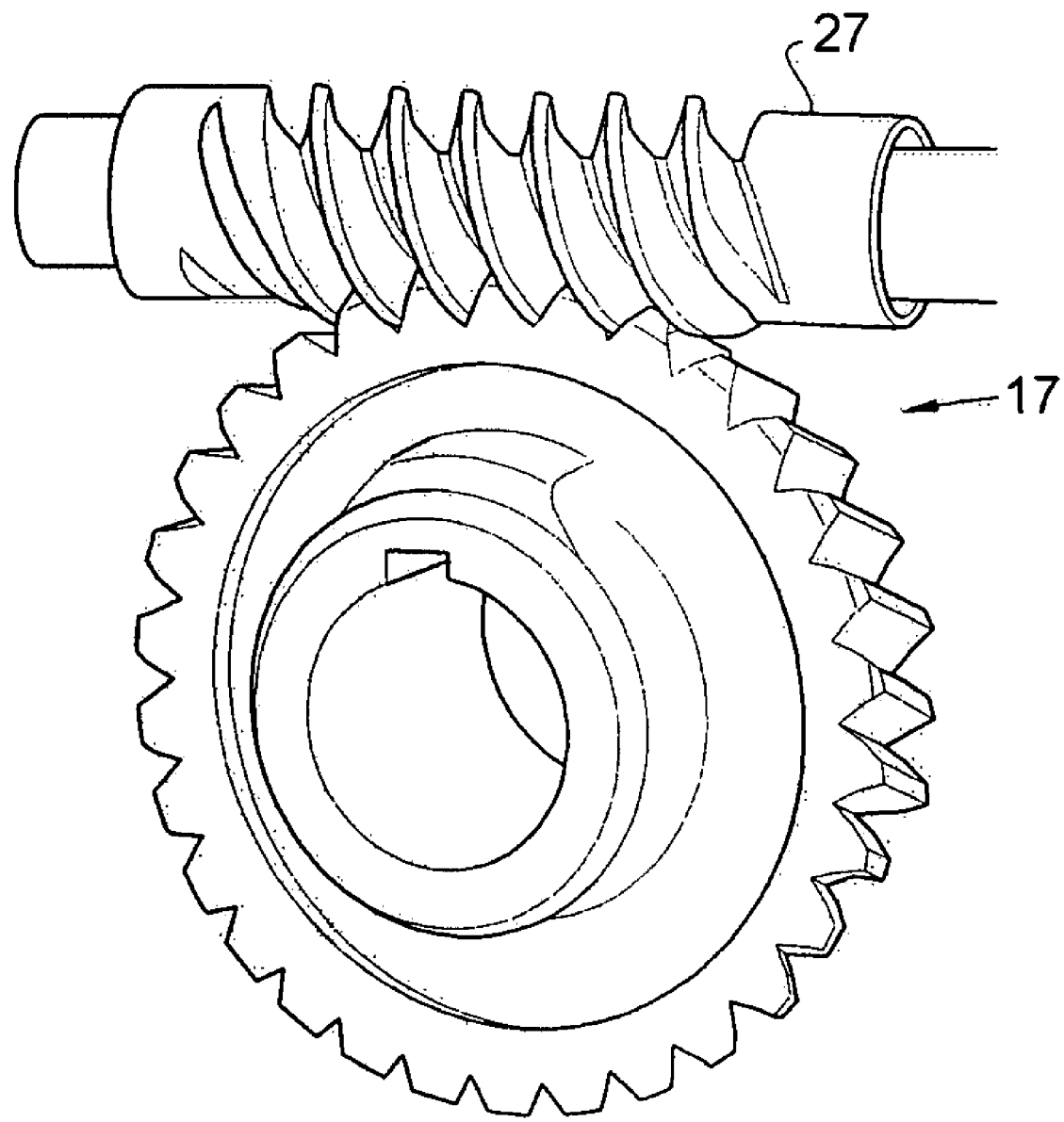
FIG. 7 is an illustration of a worm gear.

A lift mechanism 16 (preferably a worm drive or screw drive as illustrated in FIG. 7) is operationally connected to the frame 12 so that the lift arms can be moved from a lowered position (resting on the ground) as shown in FIG. 1, to a raised position, as shown in FIGS. 2 and 6. The preferred lift mechanism 16, with a worm drive 17, can be either manually operated or activated with an electric motor. The worm drive 17 is dimensioned and configured so that a worm gear 27 is located within the frame 12, and is positioned in axial register with frame 12. When the worm gear 27 rotates, the carry arms 14 are moved in a direction parallel to the frame 12. The worm gear 27 can be rotated either by a manual hand-crank 37, an electric motor 47, or another powered source. The lift mechanism houses the hand-crank 37 and electric motor 47.

Continuing with FIG. 3, the lift 12 includes a mounting arm 24 that is preferably dimensioned and configured to matingly engage with a conventional trailer hitch receiver on a towing vehicle. A height-adjusting mechanism 26 is provided to raise or lower the mounting height of the entire frame 12 via a series of horizontally-oriented apertures. See also FIG. 4. The height-adjusting mechanism 26 is located between the frame 12 and the mounting arm 24 and allows the lift 12 to be attached on vehicles that have differing ground clearances (e.g., a four-wheel drive pick-up truck versus a sedan) while ensuring that the lift arms 14 will contact the ground when in the lowered position as shown in FIG. 1. The height-adjusting mechanism 26 is secured to the mounting arm 24 preferably with two removable lynch pins inserted through the horizontally-oriented apertures.

In the preferred embodiment as shown in FIG. 3, the lift includes a power inverter/converter 20, and a corresponding charging cord 22. As shown in the figures, the inverter/converter 20 and cord 22 are dimensioned and configured to charge a Segway®-brand human transporter. The inverter/converter 20 and cord 22 may be dimensioned and configured to provide power to whatever type of cargo is placed upon the lift 10 without limitation (e.g., a different type of scooter, a refrigeration unit, a heater, a lighting unit, etc.)

Figure 5:
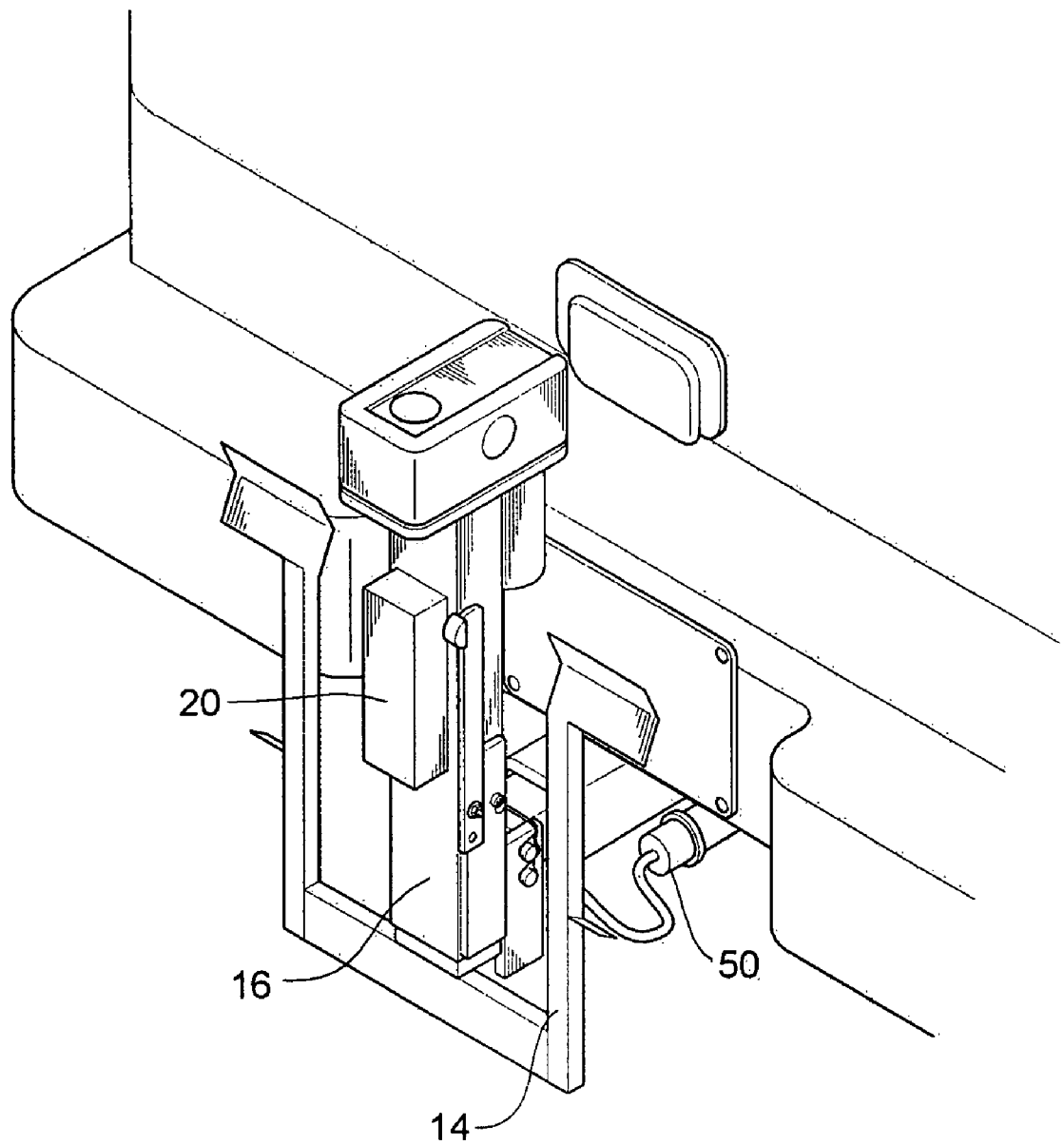
FIG. 5 is side elevation of the cargo lift mounted to a towing vehicle, with the carrying arms folded in a position parallel to the frame.

As shown in FIG. 5, a particularly advantageous aspect of the invention is that the lift mechanism 16 and the inverter/converter 20 are both powered by a conventional trailer electrical socket 50. In FIG. 5, the socket 50 is shown as the preferred 7-pin wiring harness that is standard equipment in the United States and many other countries. Other wiring harness types may also be used. In yet another embodiment, the lift mechanism 16 and the inverter/converter 20 may be powered by a battery.

Figure 4:
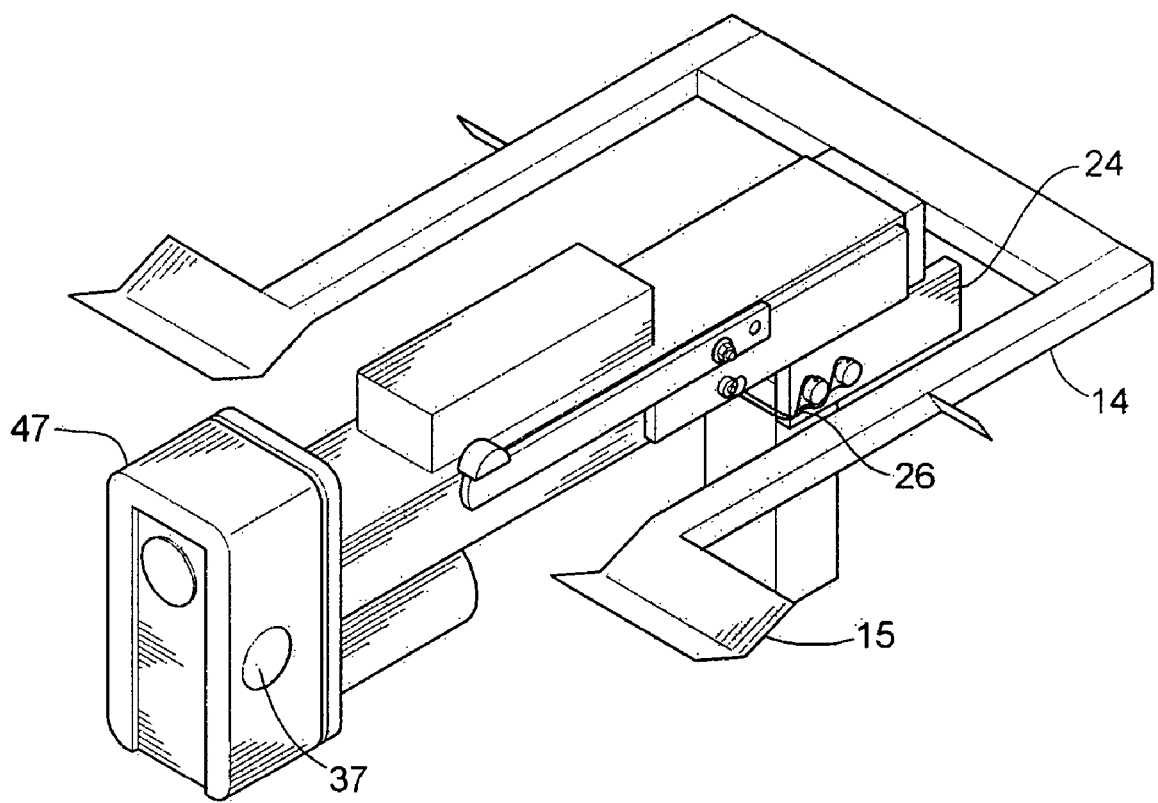
FIG. 4 illustrates the cargo lift removed from a towing vehicle and in a folded and compact position.

When not in use, the lift 10 may be removed from the vehicle and folded flat, as shown in FIG. 4. The lift 10 may also remain on the vehicle, and can be folded in place so that it rests flush with the back surface of the vehicle, as shown in FIG. 5. When folded, the carry arms 14 and the locking arms 18 pivot about their attachment points to the frame 12 so that both the carry arms 14 and the locking arms 18 are situated substantially in the same plane as the frame 12. This makes the lift extremely compact when not in use.

FIGS. 3 and 6 show the lift 10 with a Segway®-brand human transporter 100 disposed on the lift, with the lift in the raised position. The locking arms 18 engage the human transporter and securely grip it between the locking arms 18 and the carry arms 14. In the raised position, the human transporter 100 cannot be removed from the lift, short of damaging the lift, the human transporter, or both. The wheels of the human transport rest upon the chocks 15, thereby providing for secure transport of the transporter without worry of damaging it. Also, because the transporter is carried behind the vehicle, it does not gather bugs or other road debris. The inverter 20 can be operationally connected to the human transporter 100 via the cord 22. In this fashion, when the user arrives at his destination, the transporter is fully charged and ready for use.

We claim:

1. A lift for a personal mobility device comprising:
   a frame;
   two carry arms including a first carry arm and a second carry arm, wherein the carry arms are attached to the frame and are rotatably moveable from a first position substantially parallel to the frame to a second position substantially perpendicular to the frame;
   at least four wheel chocks, wherein a first wheel chock extends from the first carry arm in a direction substantially opposite the second carry arm, a second wheel chock extends from the second carry arm in a direction substantially opposite the first carry arm, a third wheel chock extends from the first carry arm substantially in a direction of the second carry arm, and a fourth wheel chock extends from the second carry arm substantially in a direction of the first carry arm, and wherein when the carry arms are in the second position the at least four wheel chocks are located on the carry arms at a position distal from the frame;
   a lift mechanism operationally linked to the frame and dimensioned and configured to translate the carry arms from a first loading position to a second towing position;
   at least one locking arm, wherein the locking arm comprises a proximal end and a distal end, wherein the locking arm is connected to the frame at its proximal end and its distal end extends perpendicularly outward from the frame and extends over the carry arms; and
   a mounting arm attached to the frame and dimensioned and configured to matingly engage a towing vehicle.

2. The lift of claim 1, wherein the at least one locking arm further comprises a bumper on the distal end.

3. The lift of claim 1, wherein the lift mechanism comprises a worm drive disposed substantially parallel to the frame, wherein a first end of the worm drive is operationally linked to the carry arms, and wherein the worm drive is dimensioned and configured so that when the worm drive is rotated the carry arms are translated from the first loading position to the second towing position.

4. The lift of claim 3, further comprising a hand crank dimensioned and configured to manually actuate the worm drive.

5. The lift of claim 3, wherein the worm drive is rotationally urged by an electric motor.

6. The lift of claim 5, further comprising a power supply conduit attached to the frame, wherein the power supply conduit is dimensioned and configured to provide power to the personal mobility device carried on the lift, and wherein the electric motor is operationally connected to the power supply conduit.

7. The lift of claim 1, further comprising a power supply conduit attached to the frame, wherein the power supply conduit is dimensioned and configured to provide power to the personal mobility device carried on the lift, and wherein the power supply conduit further comprises a power cord.

8. The lift of claim 1, wherein the frame is a telescoping frame, wherein the carry arms are translated from the first loading position to the second towing position by retracting the telescoping frame.

9. The lift of claim 1, wherein the device is configured such that when the carry arms are in the first position, the carry arms are substantially in the same plane as the frame.

10. The lift of claim 1, wherein the device is configured such that the at least one locking arm is configured to rotate into a position substantially in the same plane as the frame.

11. The lift of claim 1, wherein each of the at least four wheel chocks comprises two extensions extending substantially horizontally from one of the two carry arms, wherein a first of the two extensions extends from the one of the two carry arms at a first position along a longitudinal axis of the one of the two carry arms, a second of the two extensions extends from the one of the two carry arms at a second position along a longitudinal axis of the one of the two carry arms, and the two extensions define a gap therebetween and along the longitudinal axis of the one of the two carry arms.

12. The lift of claim 1 wherein each of the at least four wheel chocks comprises two extensions extending substantially horizontally from one of the two carry arms, a first of the two extensions extends from the one of the two carry arms at a first position along a longitudinal axis of the one of the two carry arms, and a second of the two extensions extends from the one of the two carry arms at a second position along a longitudinal axis of the one of the two carry arms, the two extensions define a gap therebetween and along the longitudinal axis of the one of the two carry arms, and the first extension, the second extension, and the gap are coordinately dimensioned and configured to suspend a first portion of a wheel of the personal mobility device below a plane defined by the one of the two carry arms and to support a second portion of the wheel of the personal mobility device above a plane defined by the one of the two carry arms.

13. The lift of claim 1, wherein when the two carry arms are in the first position, the two carry arms are substantially in the same plane as the frame with a first of the two carry arms on a first side of the frame and a second of the two carry arms on a second side of the frame.

14. The lift of claim 1, further comprising a height-adjusting mechanism fixed to the mounting arm and the frame and dimensioned and configured to raise or lower the frame in relation to the towing vehicle.

15. The lift of claim 1, further comprising a power supply conduit attached to the frame, wherein the power supply conduit is dimensioned and configured to provide power to the personal mobility device carried on the lift.

16. A lift for a personal mobility device comprising:
   a frame;
   two carry arms attached to the frame and rotatably moveable from a first position substantially parallel to the frame and substantially in the same plane as the frame to a second position substantially perpendicular to the frame;
   at least two wheel chocks, wherein a first of the at least two wheel chocks extends from a first of the two carry arms and a second of the at least two wheel chocks extends from a second of the two carry arms, wherein when the two carry arms are in the first position, the two carry arms are substantially in the same plane as the frame with a first of the two carry arms on a first side of the frame and a second of the two carry arms on a second side of the frame, and wherein when the two carry arms are in the second position the at least two wheel chocks are located on the two carry arms at a position distal from the frame;

a lift mechanism operationally linked to the frame and dimensioned and configured to translate the carry arms from a first loading position to a second towing position;

at least one locking arm, wherein the locking arm comprises a proximal end and a distal end, wherein the locking arm is connected to the frame at its proximal end and its distal end extends perpendicularly outward from the frame and extends over the carry arms; and a mounting arm attached to the frame and dimensioned and configured to matingly engage a towing vehicle.

17. The lift of claim 16, wherein each of the at least two wheel chocks comprises two extensions extending substantially horizontally from one of the two carry arms, wherein a first of the two extensions extends from the one of the two carry arms at a first position along a longitudinal axis of the one of the two carry arms, a second of the two extensions extends from the one of the two carry arms at a second position along a longitudinal axis of the one of the two carry arms, and the two extensions define a gap therebetween and along the longitudinal axis of the one of the two carry arms.

18. The lift of claim 16 wherein the at least two wheel chocks are each dimensioned and configured to suspend a first portion of a wheel of the personal mobility device below a plane defined by at least one of the two carry arms and to support a second portion of the wheel of the personal mobility device above a plane defined by the at least one of the two carry arms.

* * * * *